(12) United States Patent
Shiotani et al.

(10) Patent No.: US 11,118,720 B2
(45) Date of Patent: Sep. 14, 2021

(54) CABLE PROTECTOR

(71) Applicant: KUNIMORI KAGAKU CO., LTD., Komaki (JP)

(72) Inventors: Yoichi Shiotani, Komaki (JP); Yusaku Inayama, Komaki (JP)

(73) Assignee: KUNIMORI KAGAKU CO., LTD., Komaki (JP)

( * ) Notice: Subject to any disclaimer, the term of this patent is extended or adjusted under 35 U.S.C. 154(b) by 7 days.

(21) Appl. No.: 16/305,687

(22) PCT Filed: Jun. 1, 2018

(86) PCT No.: PCT/JP2018/021179
§ 371 (c)(1),
(2) Date: Nov. 29, 2018

(87) PCT Pub. No.: WO2019/087448
PCT Pub. Date: May 9, 2019

(65) Prior Publication Data
US 2021/0222819 A1 Jul. 22, 2021

(30) Foreign Application Priority Data
Nov. 6, 2017 (JP) .............................. JP2017-213826

(51) Int. Cl.
*F16L 3/015* (2006.01)
*H02G 3/04* (2006.01)
(Continued)

(52) U.S. Cl.
CPC ............ *F16L 57/06* (2013.01); *H02G 3/0468* (2013.01); *H02G 3/0475* (2013.01); *F16L 3/015* (2013.01); *F16L 3/1075* (2013.01)

(58) Field of Classification Search
CPC ......... F16L 57/06; F16L 3/1075; F16L 3/015; F16L 3/26; F16G 13/16; H02G 11/00; H02G 3/0475
(Continued)

(56) References Cited

U.S. PATENT DOCUMENTS 1,560,789 A * 11/1925 Leeh ....................... F16L 11/18
 137/355.24
7,278,253 B2 * 10/2007 Wehler ................. B25J 19/0025
 59/78.1

(Continued)

FOREIGN PATENT DOCUMENTS

JP 2016-515796 5/2015
WO WO 2012/013496 A1 2/2012
WO WO 2016/207132 A1 12/2016

OTHER PUBLICATIONS

PCT International Search Report and Written Opinion of the ISA for PCT/JP2018/021179, dated Jul. 24, 2018, 7 pgs.

*Primary Examiner* — Patrick F Brinson
(74) *Attorney, Agent, or Firm* — Bradley J. Thorson

(57) ABSTRACT

A cable protector including a series of generally cylindrical shells, with adjacent shells pivotable relative to each other; and a support member extending through the shells. The support member holds the shells so that the shells cannot be separated from each other. The support member includes arm sections, corresponding to the shells, connected by flexible linear sections extending along a central axis of the shells. Each arm section includes a base connected to the linear section, and a plurality of arms extending radially outward at equal angles. Each arm has a first end connected to the base, and a second end connected to a surface of the shell toward the central axis.

4 Claims, 10 Drawing Sheets

(51) Int. Cl.
   *F16L 57/06*   (2006.01)
   *F16L 3/10*    (2006.01)
(58) Field of Classification Search
   USPC ............ 138/110, 120, 155; 248/49; 59/78.1
   See application file for complete search history.

(56) References Cited

U.S. PATENT DOCUMENTS

| | | | |
|---|---|---|---|
| 7,584,597 B2 * | 9/2009 | Blase | F16G 13/16 248/49 |
| 9,435,464 B2 * | 9/2016 | Steeger | F16L 3/26 |
| 2010/0275570 A1 * | 11/2010 | Hermey | H02G 3/0475 59/78.1 |
| 2016/0040803 A1 | 2/2016 | Steeger | |

\* cited by examiner

CABLE PROTECTOR

RELATED APPLICATIONS

The present application is a National Phase entry of PCT Application No. PCT/JP2018/021179, filed Jun. 1, 2018, which claims priority from JP Patent Application No. 2017-213826, filed Nov. 6, 2017, said applications being hereby incorporated by reference herein in their entirety.

FIELD OF THE INVENTION

The present invention relates to a cable protector that flexibly holds cable-like objects, such as cables for power supply and electric signal transmission as well as hoses for supplying air or other fluid.

DESCRIPTION OF THE RELATED ART

Industrial robots use a large number of cable-like objects, including cables for power supply and electric signal transmission as well as hoses for supplying air or other fluid. To prevent cable-like objects attached to the movable parts from being damaged by interfering with surrounding equipment, cable protectors have been used that hold a bundle of cable-like objects inside for protecting them. The cable protector described in Japanese Patent Application Publication No. 2016-515796 includes unit hollow links connected in an articulated manner that allows the device to flex three-dimensionally. More specifically, each link includes inside support members, provided with multi-axially angle-adjustable articulated connectors, and casing parts forming a shell with an inside space where cable-like objects are routed. Two adjacent casing parts overlap in the longitudinal direction of the cable protector to form a spherical slidable mechanism, and the casing parts are supported on the inner side by the arms of the inside support members. This enables the links of the cable protector to flex in all directions, thereby increasing the degree of freedom in flexing directions of the cable-like objects protected by the cable protector.

SUMMARY OF THE INVENTION

In the cable protector described in the above-mentioned Japanese Patent Application Publication No. 2016-515796, the unit links are jointed to each other in a three-dimensionally pivotable manner with the articulated connectors that are attached to the inside support members. The articulated connectors have a problem; if the connectors have a higher connection strength, the links would not be easily dislocated but prevent smooth flexing of the cable protector, while if they have a lower connection strength, the cable protector would smoothly flex, but the links would be easily dislocated. It is therefore difficult to enable this cable protector to smoothly flex while maintaining the connection strength of the articulated connector so that the links cannot be dislocated. It is thus desirable for a three-dimensionally flexible cable protector that comprises unit members connected together to be capable of flexing smoothly while maintaining a good connection strength between the unit members.

The present disclosure, in one aspect, provides a cable protector comprising: a series of generally cylindrical shells, with adjacent shells pivotable relative to each other; and a support member through the shells, the support member holding the shells so that the shells cannot be separated from each other, the support member comprising arm sections, corresponding to the shells, connected by flexible linear sections extending along a central axis of the shells; each arm section comprising a base connected to the linear section, and a plurality of arms extending radially outward at equal angles, each arm having a first end connected to the base, and a second end connected to a surface of the shell toward the central axis.

In some embodiments, the adjacent shells are connected in series in a relatively pivotable manner and held by the support member so as not to be separated. The support member comprises the arm section with a plurality of arms connected by the flexible linear sections, each arm having a first end connected to the base and a second end connected to a surface of the shell toward the central axis. The linear sections are freely three-dimensionally bendable with no slidable parts, so the support member can bend three-dimensionally at the linear sections between the arm sections, and the shells supported by it is also slide smoothly. The linear section has a certain tensile strength. This allows the cable protector to smoothly three-dimensionally flex while maintaining a good connection strength between the shells.

In some embodiments, each arm section comprises a skeleton formed of a harder plastic, and a covering portion formed of the same softer plastic as the flexible linear section, the covering portion covering at least part of the surface of the skeleton, and the covering portion being molded unitary with the linear section.

In some embodiments, the covering portion of the arm section and the linear section are formed unitary of the same plastic, thereby allowing the arm section and the linear section to be strongly fixed, increasing the tensile strength of the support member in the longitudinal direction of the cable protector.

In some embodiments, each shell comprises an outer shell section having an inner surface defining part of a first sphere, and an inner shell section having an outer surface defining part of a second sphere, the outer and inner shell sections abutting axially of the cylindrical shell; each pair of adjacent shells being arranged such that the inner shell section of a first of the adjacent shells bears against the outer shell section of a second of the adjacent shells, and the center of the second sphere of the inner shell section of the first shell coincides with the center of the first sphere of the outer shell section of the second shell, and the linear section being positioned such that the coinciding sphere center falls on the central axis of the linear section.

In some embodiments, the linear sections are positioned such that the centers of the spheres of the shells lie on the central axis of the linear sections, thereby allowing smooth slide of the adjacent shells in the spherical slidable mechanism when the linear sections are bent. This allows the cable protector to more smoothly three-dimensionally flex, keeping the gap between the shells uniform.

In some embodiments, each arm includes a lockable portion at the second end, and each shell includes corresponding locking portions on a surface of toward the central axis, the locking portions of the shells engaging the lockable portions so that the shells are connected to the support member.

The above configuration facilitates attachment of the shell to the support member.

In some embodiments, each shell comprises at least one opening/closing circumferential segment making a cable accessible to inside from outside, the at least one opening/closing segment having a first circumferential end including one of the locking portions, and a second circumferential end including a hinge pin extending parallel to the central axis, the opening/closing segment being connected at the second circumferential end to another segment of the shell by the hinge pin, allowing the opening/closing segment to be opened and closed.

In some embodiments, each shell has an opening/closing segment, which allows placement of cable-like objects into the shells after the cable protector has been assembled by attaching the shells in series to the supporting member. This facilitates placement of cable-like objects into the cable protector. Furthermore, the second circumferential end of the opening/closing segment is connected to another segment of the shell in an openable and closable manner by the hinge pin, further facilitating placement of a cable in the cable protector.

DETAILED DESCRIPTION OF THE INVENTION

Figure 1:
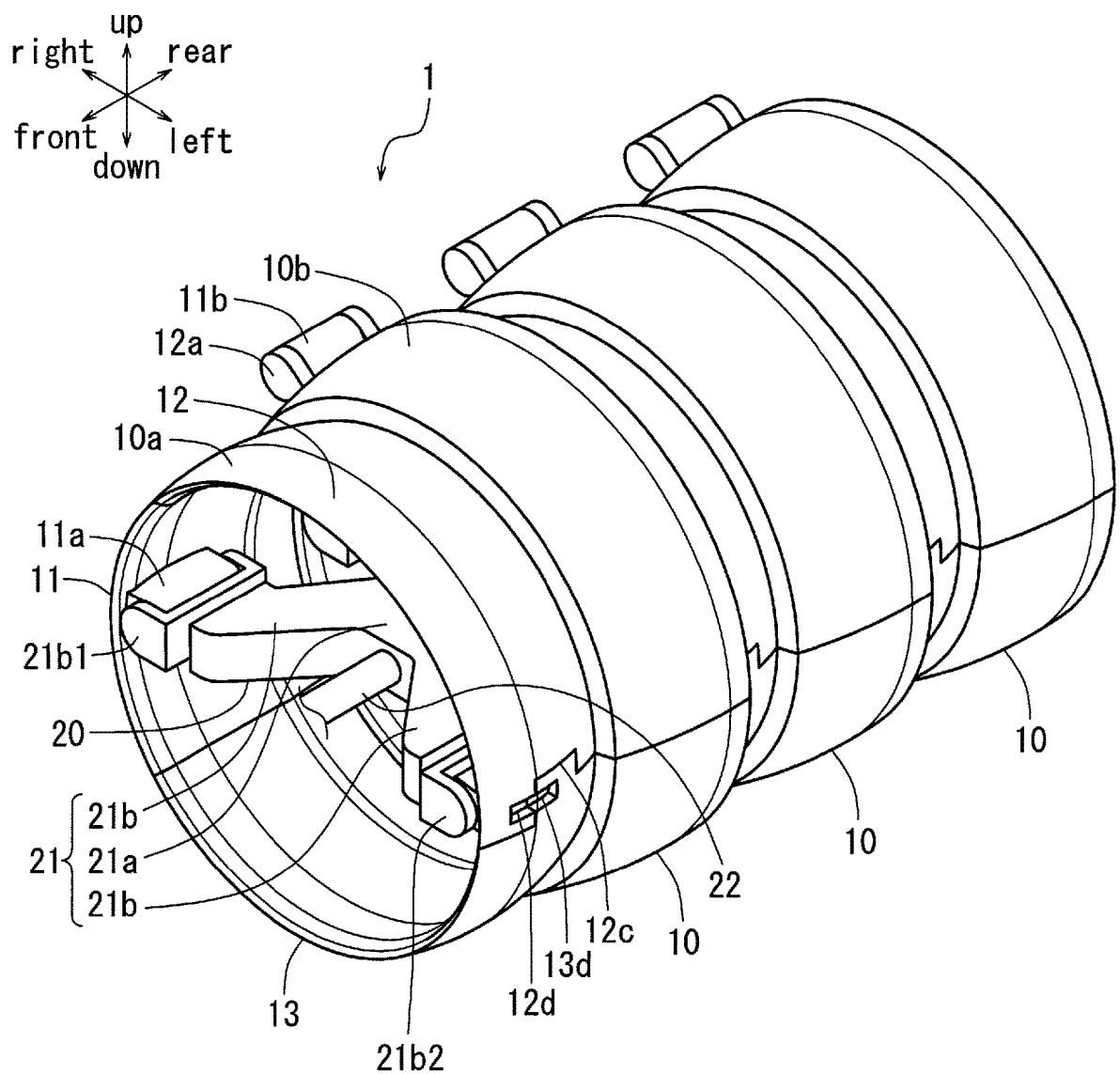
FIG. 1 is a perspective view of part of a cable protector according to an embodiment of the present disclosure, with the shells closed.
Figure 2:
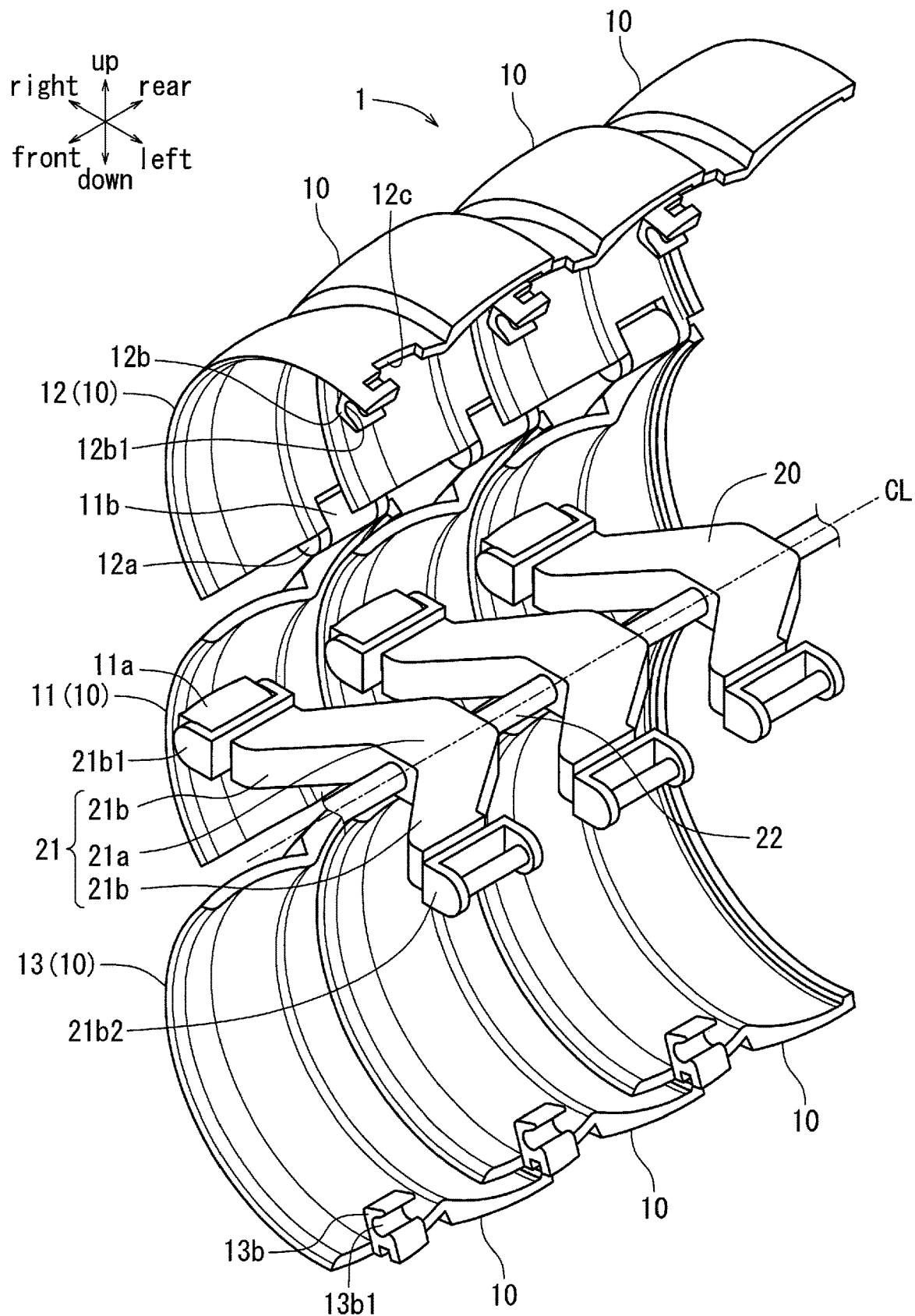
FIG. 2 is a perspective view of part of a cable protector, with the shells opened.

Embodiments of the present invention will be described with reference to the drawings. FIGS. 1 to 10 show cable protector 1 according to an embodiment. Referring to FIG. 1, the cable protector 1 includes a plurality of shells 10 arranged in series, partially overlapping each other, and connected by a support member 20 through the shells 10. Once cable-like objects are routed through the shells 10, the cable protector 1 protects the cable-like objects flexibly. For the purpose of describing the embodiments, the front-to-rear direction is defined as the longitudinal direction of the supporting member 20 or cable protector 1 in the stretched position as shown in FIG. 1, and the vertical direction as perpendicular to the base 21a (described later). The front, rear, up, down, left and right directions are indicated by arrows in each of the figures, and the directional references in the following descriptions are based on the shown directions. In descriptions of the shell 10 and the arm section 21 (described later) of the support member 20, the foremost shown shell 10 and the foremost shown arm section 21 of the support member 20 will be described as representative.

Figure 9:
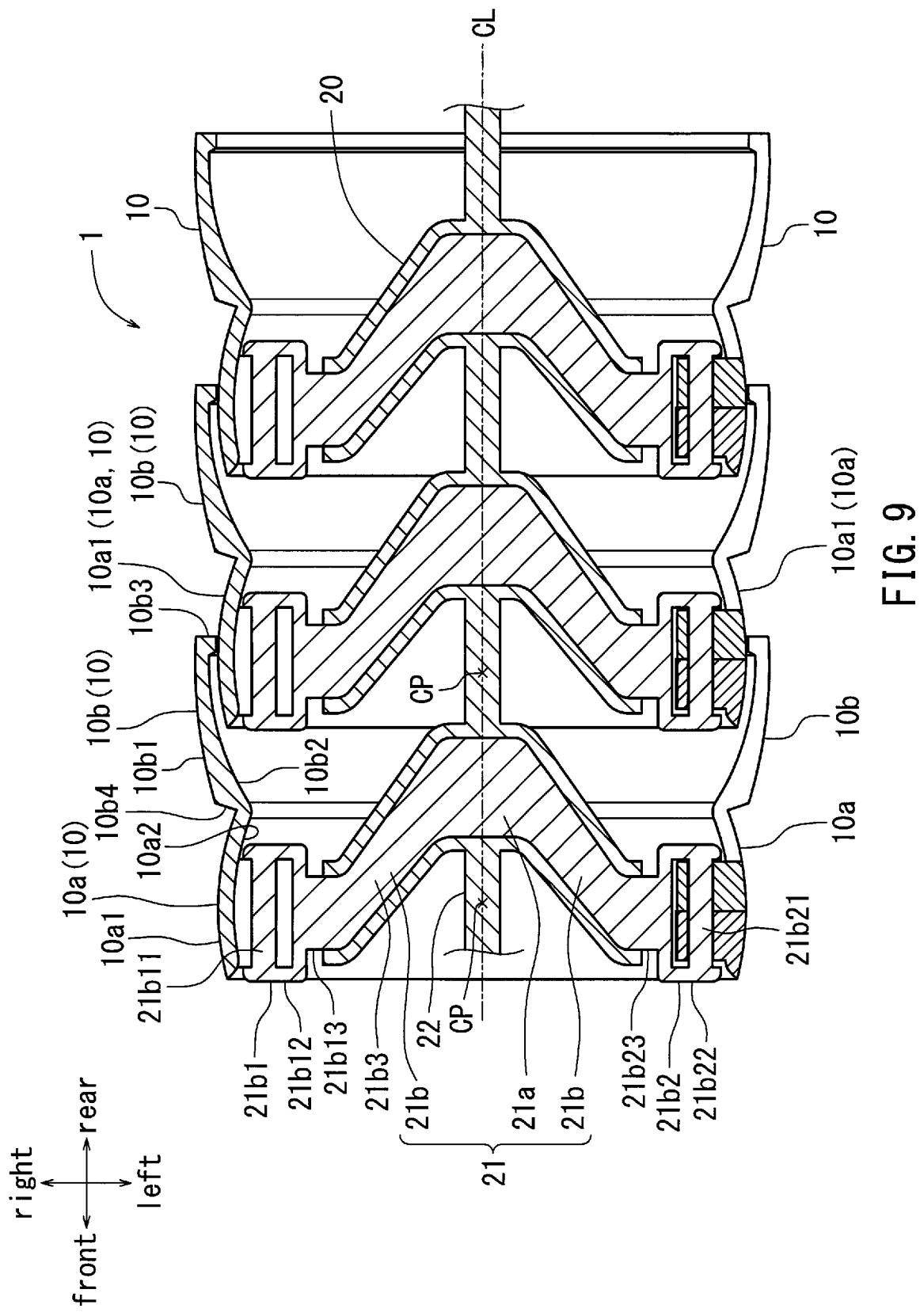
FIG. 9 is a cross-sectional view of the cable protector shown in FIG. 3 at line IX-IX, showing the cable protector in the unbent position.
Figure 10:
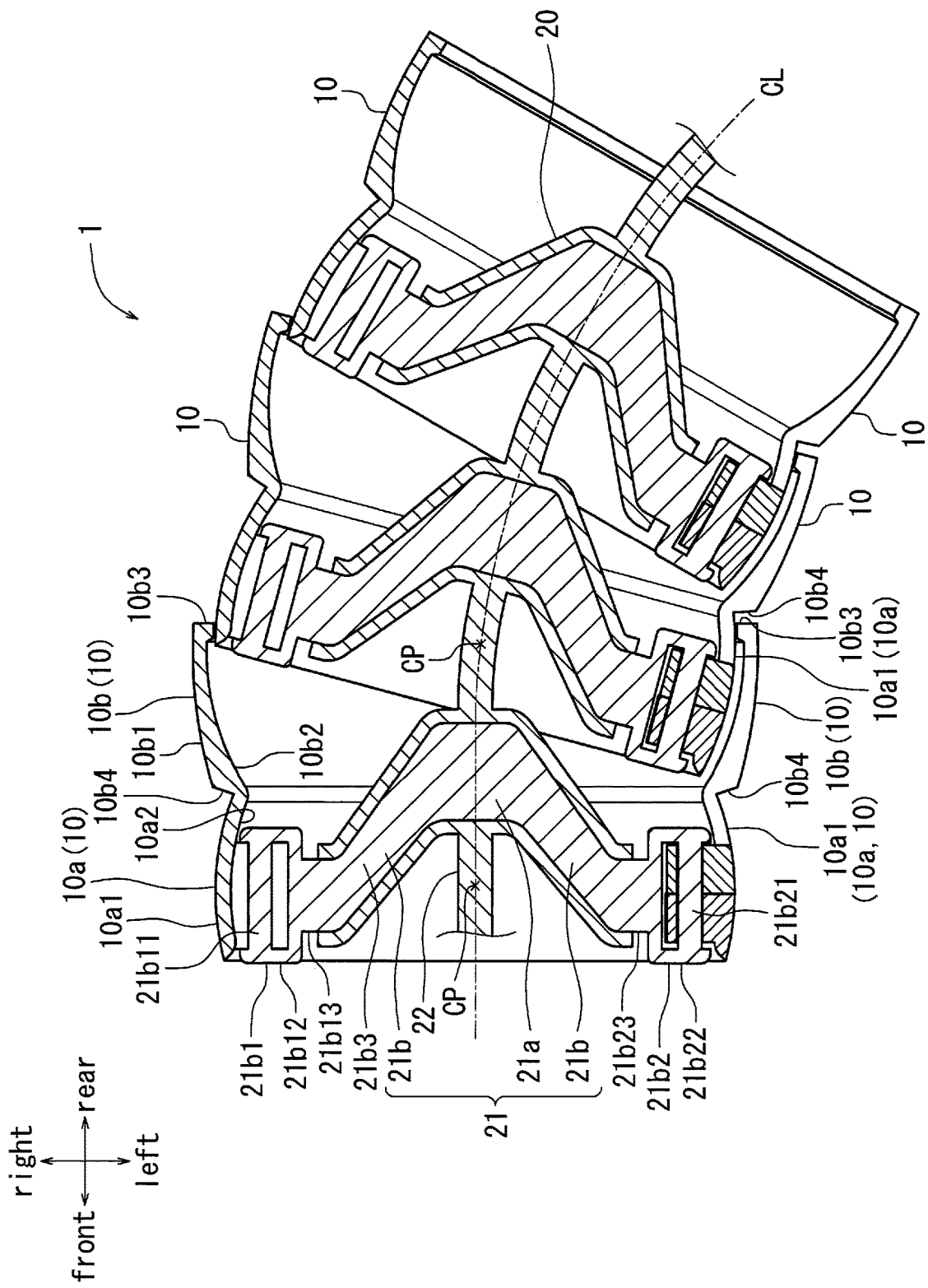
FIG. 10 is a cross-sectional view of the cable protector shown in FIG. 9 in the bent position.

Referring to FIGS. 1 to 6, the shell 10, in a closed position, is generally cylindrical, bored in the front-to-rear direction, and is molded of a plastic. The plastic used may be a harder plastic (for example, nylon 66). Specifically, as shown in FIGS. 1 and 9, the shell 10, in the closed position, is divided into a front and a rear part: an inner shell section 10a and an outer shell section 10b. The inner shell section 10a has an outer surface 10a1 defining part of a first sphere that is centered on the central axis CL and midway between the front and rear of the inner shell section 10a, and an inner surface 10a2 located inward of the outer surface 10a1 by the thickness. The center of the first sphere will be called sphere center CP. The outer shell section 10b has an inner surface 10b2 defining part of a second sphere that is centered at the sphere center CP of the inner shell section 10a of the adjacent shell 10 (the rear shell 10 in FIG. 9) when the cable protector 1 is in the unbent position. The inner surface 10b2 has, at the rear end, a projection 10b3 projecting radially inward of the shell 10. The outer shell section 10b also has an outer surface 10b1 such that its thickness increases from the rear end toward the front end with respect to the inner surface 10b2. Between the front end of the outer surface 10b1 of the outer shell section 10b and the rear end of the outer surface 10a1 of the inner shell section 10a, there is a stopper face 10b4 lying in a radial plane of the inner shell section 10a. When the cable protector 1 is being flexed as shown in FIG. 10 out of the unbent position, the rear end face of the projection 10b3 butts against the stopper face 10b4 of the adjacent shell 10 (the rear shell 10 in FIG. 10), thereby preventing further flexing. The outer surface 10a1 of the inner shell section 10a of one of two adjacent shells 10 and the inner surface 10b2 of the outer shell section 10b of the other form a spherical slidable mechanism.

Figure 3:
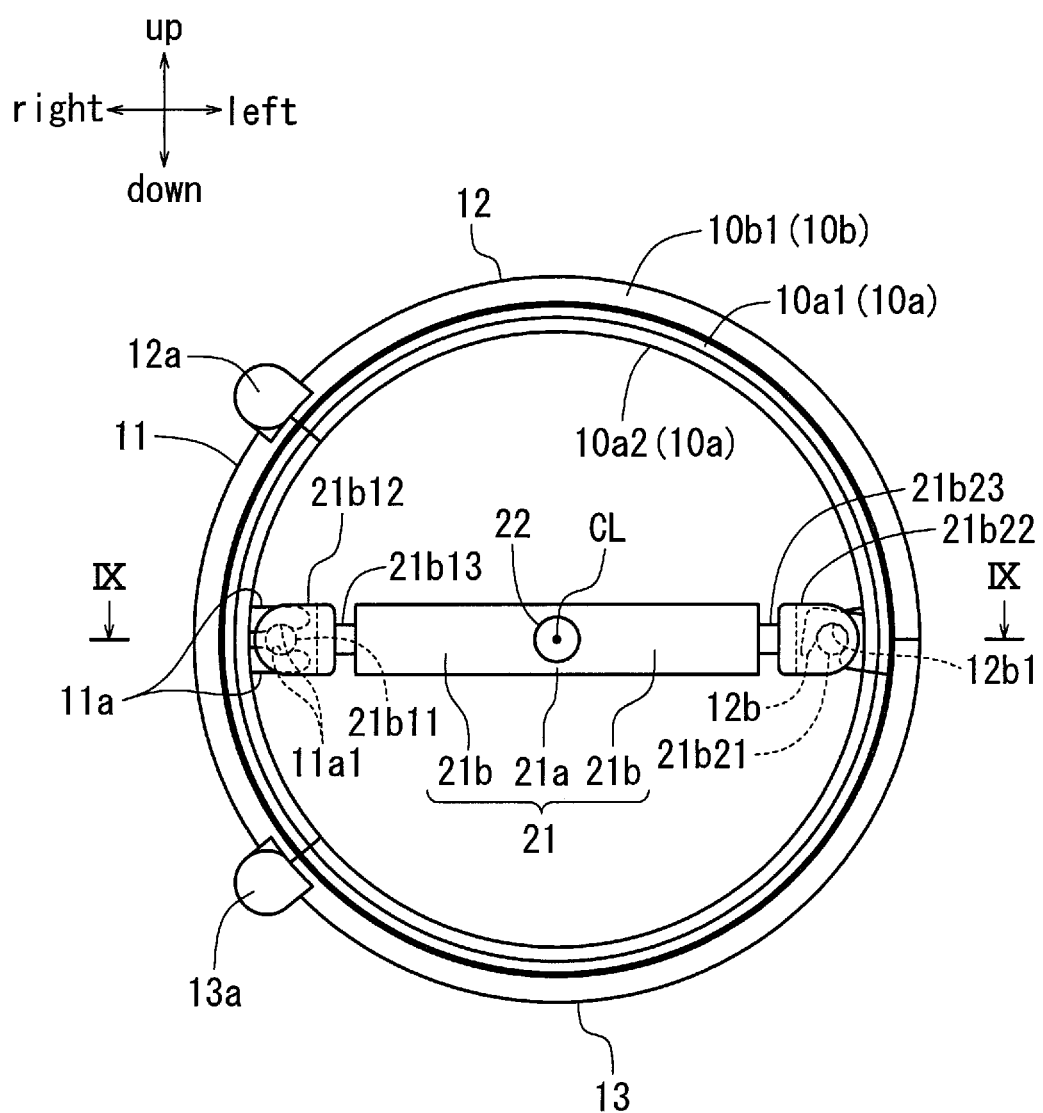
FIG. 3 is a side view of a cable protector, with the shells closed.

Referring to FIGS. 2 to 6, the shell 10 includes, circumferentially, a first segment 11, a second segment 12 (opening/closing segment), and a third segment 13 (opening/closing segment), the second and third segments being hinged to the first segment 11 in an openable and closable manner. The circumferential length (or arc length) of the first segment 11 is shorter than that of the second and third segments 12 and 13, and the circumferential length of the second and third segments 12 13 are equal, as shown in FIG. 3. The first, second and third segments 11, 12 and 13 each includes corresponding portions of the inner and outer shell sections 10a and 10b.

Figure 4:
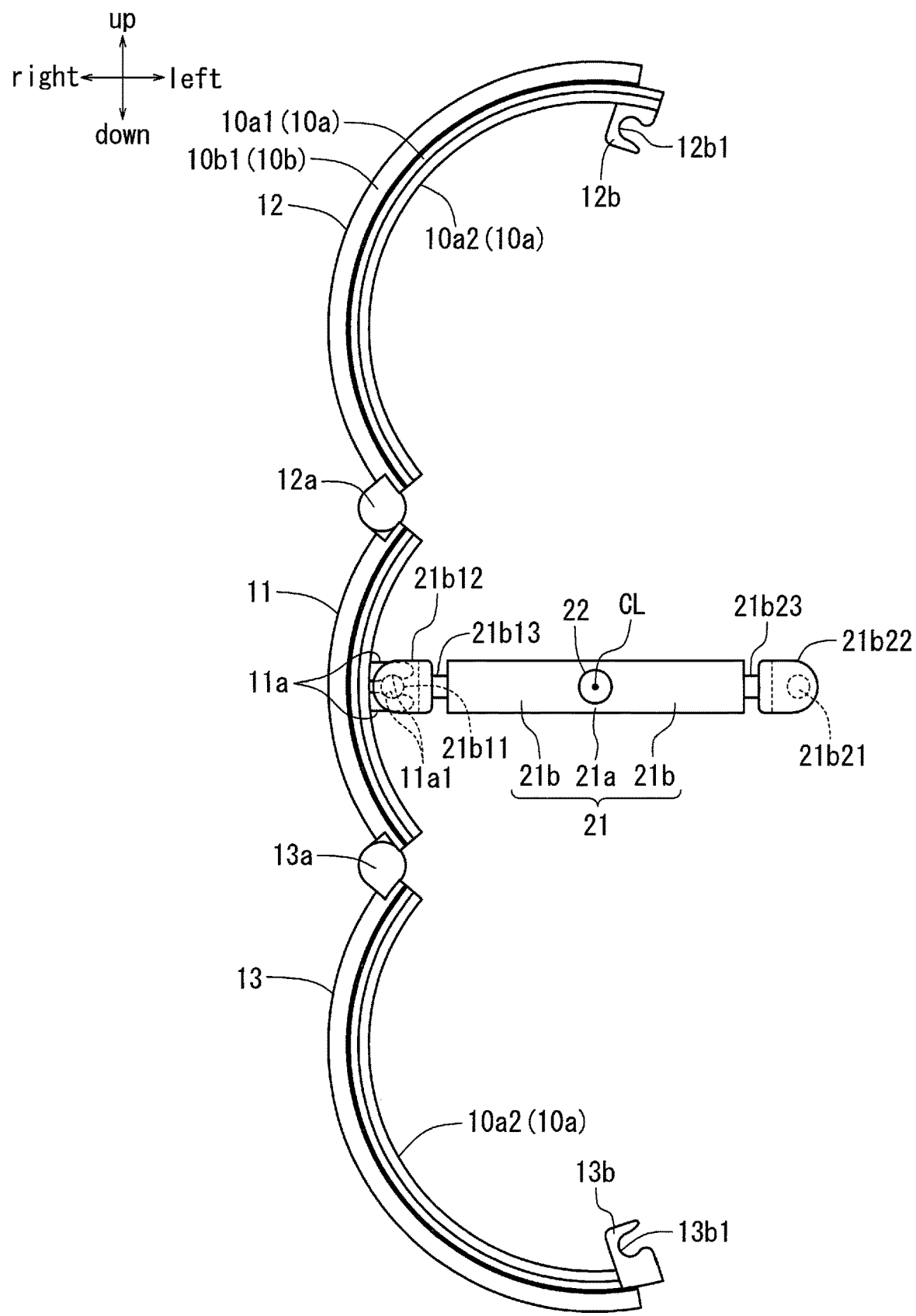
FIG. 4 is a side view of a cable protector, with the shells opened.
Figure 5:
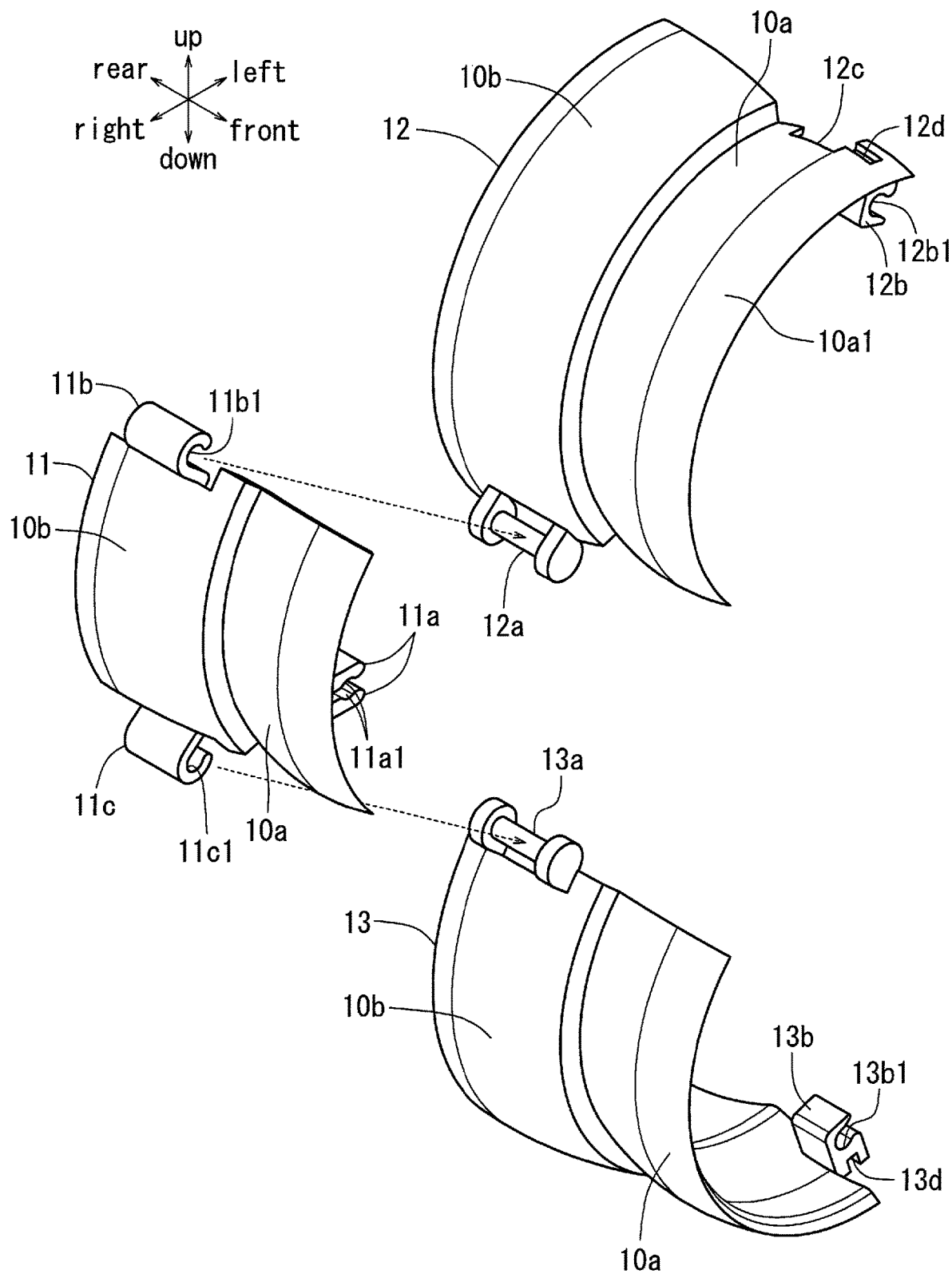
FIG. 5 is an exploded perspective view of a shell of a cable protector.
Figure 6:
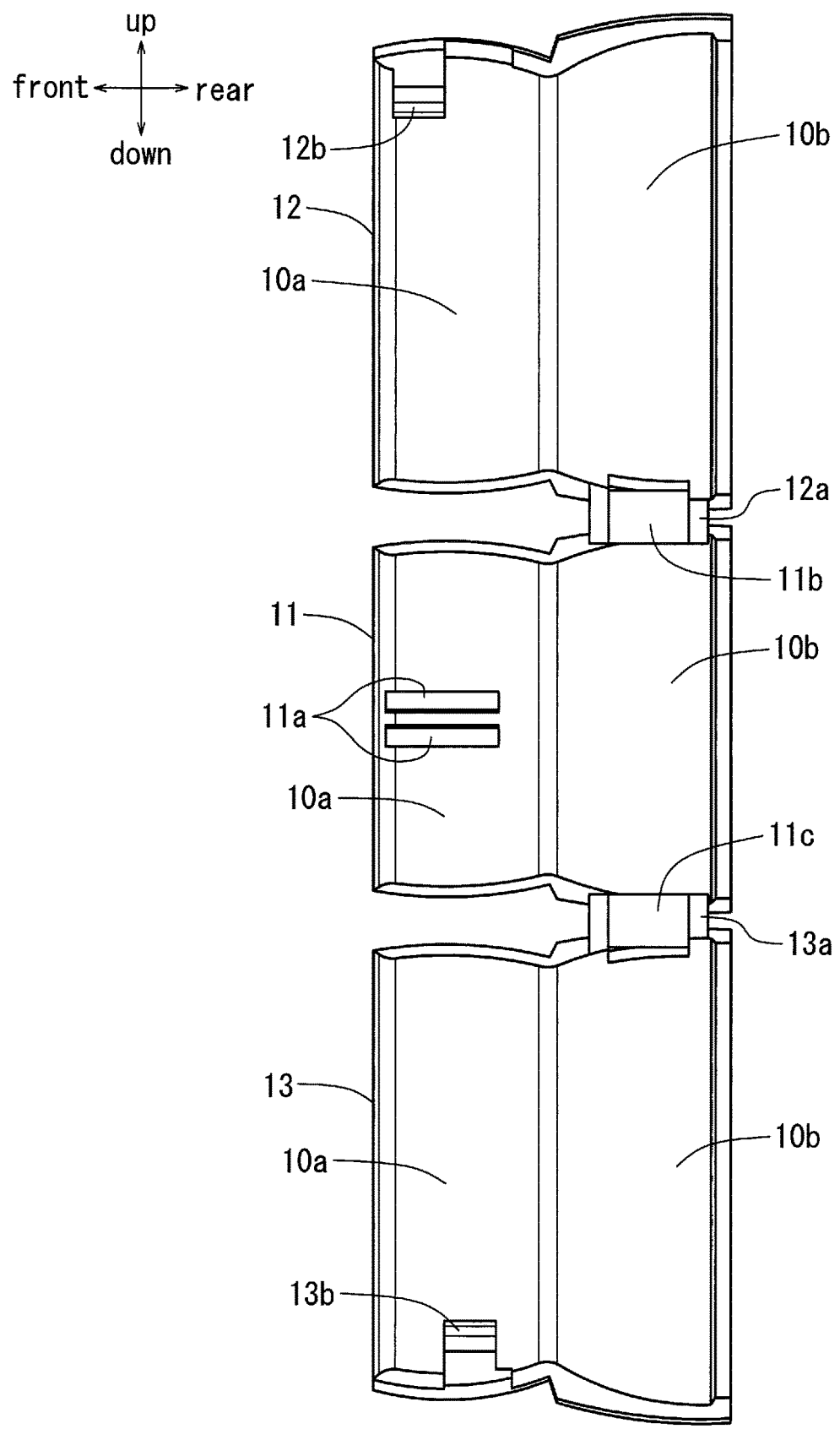
FIG. 6 is a view of a shell of a cable protector developed.
Figure 7:
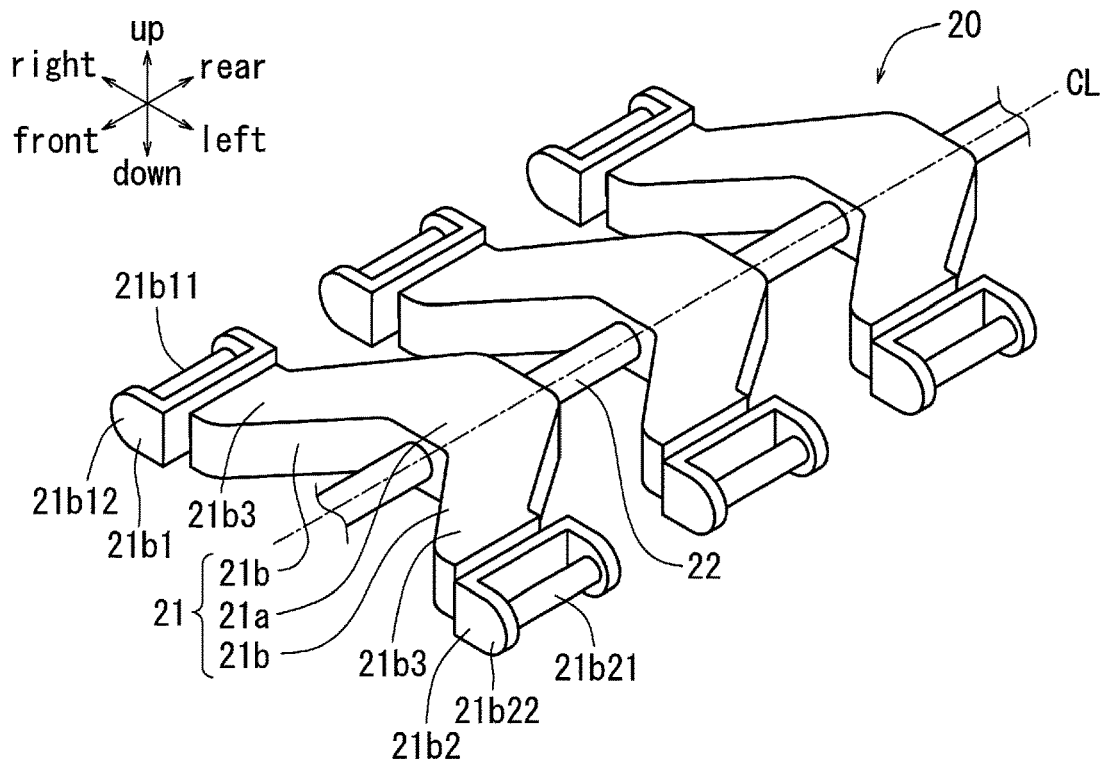
FIG. 7 is a perspective view of a support member of a cable protector.

Referring to FIGS. 4 to 6, the inner shell section 10a of the first segment 11 may include, a pair of parallel engagement ribs 11a (a lockable portion) projecting leftward (i.e. toward the central axis CL) from the inner surface 10a2 at the circumferential center, extending front to rear. The engagement ribs 11a each has respective first engagement grooves 11a1 open toward each other extending front to rear. The first segment 11 is connected to the support member 20 by engagement of the first engagement bar 21b11 of the support member 20 (described later) with the first engagement grooves 21a1. The outer shell section 10b of the first segment 11 includes an upper engagement portion 11b projecting radially from the upper circumferential end. The upper engagement portion 11b includes an upper engagement groove 11b1 with a generally U-shaped cross section, open toward the central axis CL, extending front to rear. The second segment 12 (described later) is pivotably connected to the first segment 11 by engagement of the engagement pin 12a of the second segment 12 with the upper engagement groove 11b1. The outer shell section 10b of the first segment 11 includes a lower engagement portion 11c projecting radially from the lower circumferential end. The lower engagement portion 11c includes a lower engagement groove 11c1 with a generally U-shaped cross section, open toward the central axis CL, extending front to rear. The third segment 13 (described later) is pivotably connected to the first segment 11 by engagement of the engagement pin 13a of the third segment 13 with the lower engagement groove 11c1.

Referring to FIGS. 4 to 6, the outer shell section 10b of the second segment 12 includes, at the lower circumferential end, an engagement pin 12a (a hinge pin) projecting radially of the shell 10. The second segment 12 is pivotably connected to the first segment 11 by engagement of the engagement pin 12a with the upper engagement groove 11b1 of the first segment 11 so that The inner shell section 10a of the second segment 12 includes, at the upper circumferential end, an engagement projection 12b (a lockable portion) projecting from the front edge of the inner surface 10a2 toward the central axis CL when the second segment 12 is closed to the first segment 11. The engagement projection 12b includes a front second engagement groove 12b1 extending front to rear and having a generally U-shaped transverse cross section whose open side is inclined slightly toward the central axis CL from the circumferential direction of the inner surface 10a2 of the engagement projection 12b, as shown in FIG. 4. This inclination is intended to make it difficult for the second engagement bar 21b21 to slip out of the front second engagement groove 12b1 when the second engagement bar 21b21 of the support member 20 (described later) is engaged with the second front engagement groove 12b1. The inner shell section 10a of the second segment 12 includes, on the rear side of the engagement projection 12b, a notch 12c that is cut in the circumferential direction from the upper circumferential end as seen in FIG. 5, and is rectangular as viewed in the radial direction. The notch 12c receives part of the third segment 13 (described later) when the third segment 13 is closed to the second segment 12. The inner shell section 10a of the second segment 12 includes, in the outer surface 10a1, a release groove 12d with a rectangular cross section elongated front to rear, located outward of the engagement projection 12b in the radial direction of the shell 10.

Referring to FIGS. 4 to 6, the outer shell section 10b of the third segment 13 includes, on the upper circumferential end, an engagement pin 13a (a hinge pin) projecting radially of the shell 10. The third segment 13 is pivotably connected to the first segment 11 by engagement of the engagement pin 13a with the lower engagement groove 11c1 of the first segment 11. The inner shell section 10a of the third segment 13 includes, on the lower circumferential end, an engagement projection 13b (a lockable portion) projecting from a location of the inner surface 10a2 corresponding to the notch 12c of the second segment 12 toward the central axis CL when the third segment 13 is closed to the first segment 11. The engagement projection 13b slightly circumferentially protrudes from the lower circumferential end of the inner shell section 10a of the third segment 13. The engagement projection 13b includes a second engagement groove 13b1 extending front to rear and having a generally U-shaped transverse cross section whose open side is inclined slightly toward the central axis CL from the circumferential direction of the inner side 10a2 of the engagement projection 13b, as shown in FIG. 4. This inclination is intended to make it difficult for the second engagement bar 21b21 to slip out of the rear second engagement groove 13b1 when the second engagement bar 21b21 of the support member 20 (described later) is engaged with the second rear engagement groove 13b1. The inner shell section 10a of the third segment 13 includes a release groove 13d in a location of the outer surface 10a1 corresponding to the engagement projection 13b radially of the shell 10. The release groove 13d has a rectangular cross section, elongated front to rear. When the third segment 13 is closed to the second segment 12, the release groove 12d of the second segment 12 is aligned in a front-to-rear line with the release groove 13d of the third segment 13, as shown in FIG. 1. The release grooves 12d and 13d are for disengaging the second and third segments 12 and 13 from the second engagement bars 21b21 (see FIGS. 3 and 4) by, for example, a flathead screwdriver fitted and twisted in the grooves 12d and 13d.

Referring to FIGS. 2 and 7 to 9, the support member 20 is made of one or more plastics and comprises arm sections 21, positioned corresponding to respective shells 10, connected by linear sections 22. The plastic used may be a harder plastic (e.g., nylon 66) and a softer plastic (e.g., nylon 12) for the arm section 21, and a softer plastic for the linear sections 22.

Figure 8:
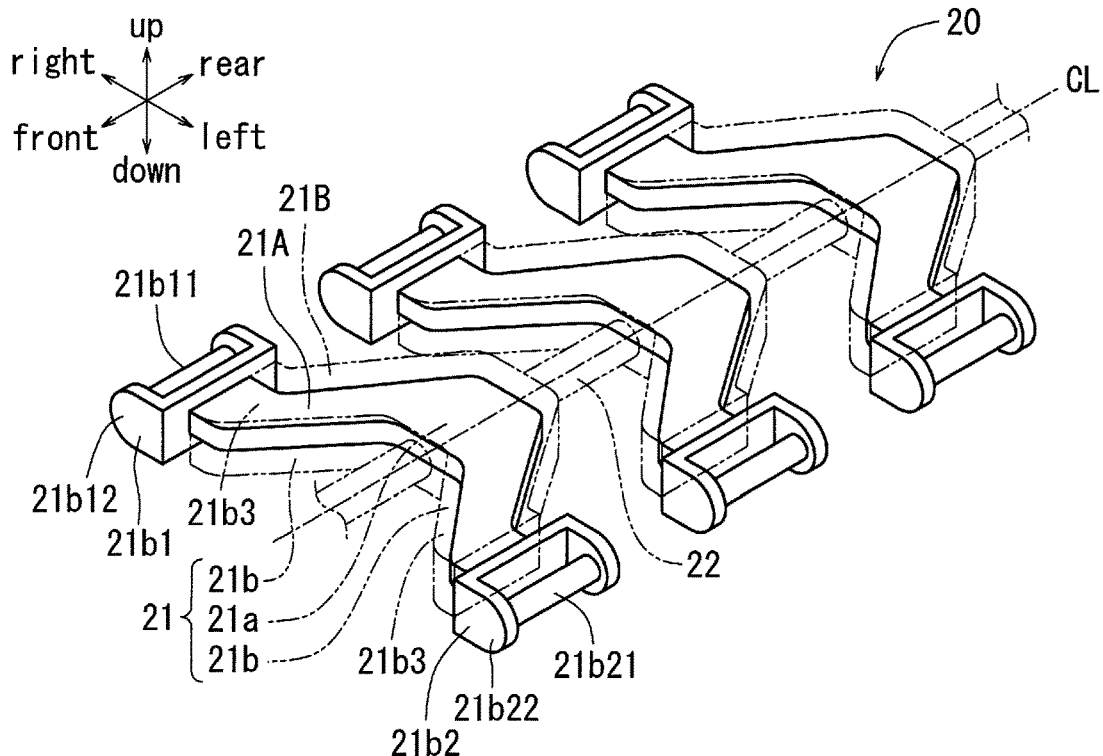
FIG. 8 is a perspective view of a support member of a cable protector, indicating the harder plastic portions and the softer plastic portions.

The arm section 21 includes a base 21 generally rectangular as viewed from the top, and a pair of right and left arms 21b with a first end connected to the base 21a and the second end extending away from the central axis CL. The second end of the arm 21b is offset forward with respect to the first end, so that the arm section 21 has an angle shape with the base 21a as the apex as viewed from the top side. The right arm 21b includes, on its second end, a first engagement portion 21b1 (a locking portion) including the first engagement bar 21b11 extending front to rear. The left arm 21b includes, on its second end, a second engagement portion 21b2 (a locking portion) including the second engagement bar 21b21 extending front to rear. The first and second engagement bars 21b11 and 21b21 are cylindrical with the same diameter and length. More specifically, the arms 21b include, together with the first and second engagement portions 21b1 and 21b2, a pair of right and left arm main portions 21b3 generally in a shape of parallelogram as viewed from the top, connecting the first and second engagement portions 21b1 and 21b2 to the base 21a. The first engagement portion 21b1 includes a first engagement bar 21b11, a generally U-shaped, bar-supporting portion 21b12 open rightward as viewed from the top (i.e. away from the central axis CL), and a connecting portion 21b13 connecting the non-open side of the bar-supporting portion 21b12 to the right end of the right arm main portion 21b3. The first engagement bar 21b11 is supported between the side walls of the bar-supporting portion 21b12 at both ends thereof and extends in the front-to-rear direction. The second engagement portion 21b2 includes a second engagement bar 21b21, a generally U-shaped, bar-supporting portion 21b22 open leftward as viewed from the top (i.e. away from the central axis CL), and a connecting portion 21b23 connecting the non-open side of the bar-supporting portion 21b22 to the left end of the left arm main portion 21b3. The second engagement bar 21b21 is supported between the side walls of the bar-supporting portion 21b22 at both ends thereof and extends in the front-to-rear direction. As shown in FIG. 8, the base 21a and the pair of left and right arm main portions 21b3 include a skeletal portion 21A (skeleton) of a harder plastic, and a covering portion 21B of a softer plastic covering the surface of the skeletal portion 21A. The first and second engagement portions 21b1 and 21b2 may be formed of the harder plastic. Specifically, the skeletal portion 21A of the base 21a and left and right arm main portions 21b3 are molded of the harder plastic in a unitary piece with the first and second engagement portions 21b1 and 21b2.

The linear section 22 may be a cylindrical rod of a softer plastic, so that it is good in flexibility. The linear section 22 is positioned such that its central axis coincides with the central axis CL, and the ends are connected to adjacent bases 21a of the arm sections 21 arranged front to rear at regular intervals. More specifically, both ends of the linear sections 22 are connected to the adjacent bases 21a by unitary molding with the covering portions 21B of the bases 21a. The arm sections 21 are thus connected with a high strength by the linear sections 22, which have a good flexibility, so that the support member 20 is freely bendable in the vertical and lateral directions with respect to the front-to-rear direction. As shown in FIG. 9, the sum of the front-to-rear length of the base 21a and the length of the linear section 22 is equal to the difference of the front-rear length of the shell 10 minus the front-rear length of the overlap of the adjacent shells 10. The linear section 22 corresponds in the forward-rearward position to the first engagement portion 21b1 and the second engagement portion 21b2 of the arm 21b. The support member 20 may be formed integral by double-injection molding using the harder and softer plastics.

The steps of assembly of the cable protector 1 will now be described with reference to FIGS. 1 to 5. A desired number of shells 10 are prepared from separately injection-molded portions 11, 12 and 13 by assembling the first segment 11 together with the second and third segments 12 and 13, as shown in FIG. 5. Specifically, the engagement pin 12a of the second segment 12 is fitted into the upper engagement groove 11b1 of the upper engagement portion 11b of the first segment 11. The engagement pin 13a of the third segment 13 is fitted into the lower engagement groove 11c1 of the lower engagement portion 11c of the first segment 11. Next, a support member 20 with as many arm sections 21 as the prepared shells 10 is prepared. Specifically, the support member 20 may be prepared from a previously produced, long length of support member 20 by cutting it at a linear section 22 so as to obtain as many arm sections 21 as the shells 10. Next, each of the series of first engagement bars 21b11 on the arm sections 21 is fitted into the first engagement grooves 11a1 in the first segments 11 of the shells 10. The second segment 12 is then pivoted about the engagement pin 12a with respect to the first segment 11 until the front second engagement groove 12b1 of the engagement projection 12b of the second segment 12 engages with the second engagement bar 21b21 of the arm section 21. Further, the third segment 13 is pivoted about the engagement pin 13a with respect to the first segment 11 until the rear second engagement groove 13b1 of the engagement projection 13b of the third segment 13 engages with the second engagement bar 21b21 of the arm section 21. In this way, a cable protector 1 is assembled, with the shells 10 closed as shown in FIG. 1. When cable-like objects are placed into the cable protector 1, the second segment 12 and/or third segment 13 are opened with respect to the first segment 11 and then the cable-like objects are placed. If the engagement between the second engagement bar 21b21 and the front second engagement groove 12b1 and/or rear second engagement groove 13b1 is too firm to disengage, a flathead driver may be fitted and twisted in the release grooves 12d and 13d to release the engagement. When the cable protector 1 is in the unbent position as shown in FIG. 9, about half of the front-rear length of the outer shell section 10b of a shell 10 overlaps about half of the front-rear length of the inner shell section 10a of the adjacent shell 10. When the cable protector 1 is flexed leftward as shown in FIG. 10 out of the unbent position, the outer shell section 10b of a shell 10 slides on the end of the projection 10b3 along the outer surface 10a1 of the inner shell section 10a of the adjacent shell 10. The rear end face of the projection 10b3 on the left side then butts against the stopper face 10b4 of the adjacent shell 10 so that the pivoting is stopped. A similar process occurs when the cable protector 1 is flexed in any other direction with respect to the front-to-rear direction, such as rightward, upward, and downward.

The present embodiment configured as described above provides the following advantageous effects. Adjacent shells 10 of the cable protector 1 are connected to each other in a relatively pivotable manner while being held by the support member 20 so as not to be separated. The support member 20 includes the arm sections 21 with two arms 21b extending radially away from the central axis CL, the base 21a of the arm sections 21 being connected by the flexible linear sections 22. The linear sections 22 themselves bend freely three-dimensionally and do not comprise any slidable parts, and thus the support member 20 is bendable at the linear sections 22 in between the arm sections 21, and the adjacent shells 10 supported by the linear sections 22 can smoothly slide on each other. The linear sections 22 also have a certain tensile strength. The cable protector 1 thus smoothly three-dimensionally flex while maintaining a good connection strength between the shells 10.

The support member 20 includes, integrally, the skeletal portion 21A, first engagement portion 21b1 and second engagement portion 21b2, all formed of a harder plastic, and the covering portion 21B and linear section 22, both formed of a softer plastic. The skeletal portion 21A of the arm section 21 is covered with the covering portion 21B, and the covering portion 21B and the linear section 22 are unitarily molded of the same softer plastic. This gives the support member 20 an increased front-rear tensile strength.

Each pair of adjacent shells 10 are connected, with the inner shell section 10a of one of the shells 10 covered on the outer side by the outer shell section 10b of the other shell 10. The center of the first sphere including the outer surface 10a1 of the inner shell section 10a of the one shell 10 and the center of the second sphere including the inner surface 10b2 of the outer shell section 10b of the other shell 10 coincide with each other, at the sphere center CP, and are located on the central axis of the linear section 22 inside the inner shell section 10a of the first shell 10. As a result, when the linear section 22 is bent, the adjacent shell 10 slides smoothly by the spherical slidable mechanism formed by the outer surface 10a1 of the inner shell section 10a and the inner surface 10b2 of the outer shell section 10b. This allows the cable protector 1 to smoothly three-dimensionally flex, keeping the gap between the shells 10 uniform. Furthermore, the arm section 21 of the support member 20 includes a first engagement portion 21b1 for supporting the first engagement bar 21b11. The support member 20 and the shell 10 are connected by fitting the first engagement bar 21b11 engages the first engagement groove 11a1 of the first segment 11 of the shell 10. This facilitates attachment of the shells 10 to the support member 20.

The shell 10 includes a second segment 12 pivotable about the engagement pin 12a with respect to the first segment 11, a third segment 13 pivotable about the engagement pin 13a with respect to the first segment 11. The shell 10 can be kept closed by engagement of the front second engagement groove 12b1 of the second segment 12 and the rear second engagement groove 13b1 of the third segment 13 with the second engagement bar 21b21 of the arm section 21. This allows the second segment 12 and/or third segment 13 to be pivoted with respect to the first segment 11 when cable-like objects are placed into the shells 10, thereby facilitating the placement of the cable-like object.

Figure 11:
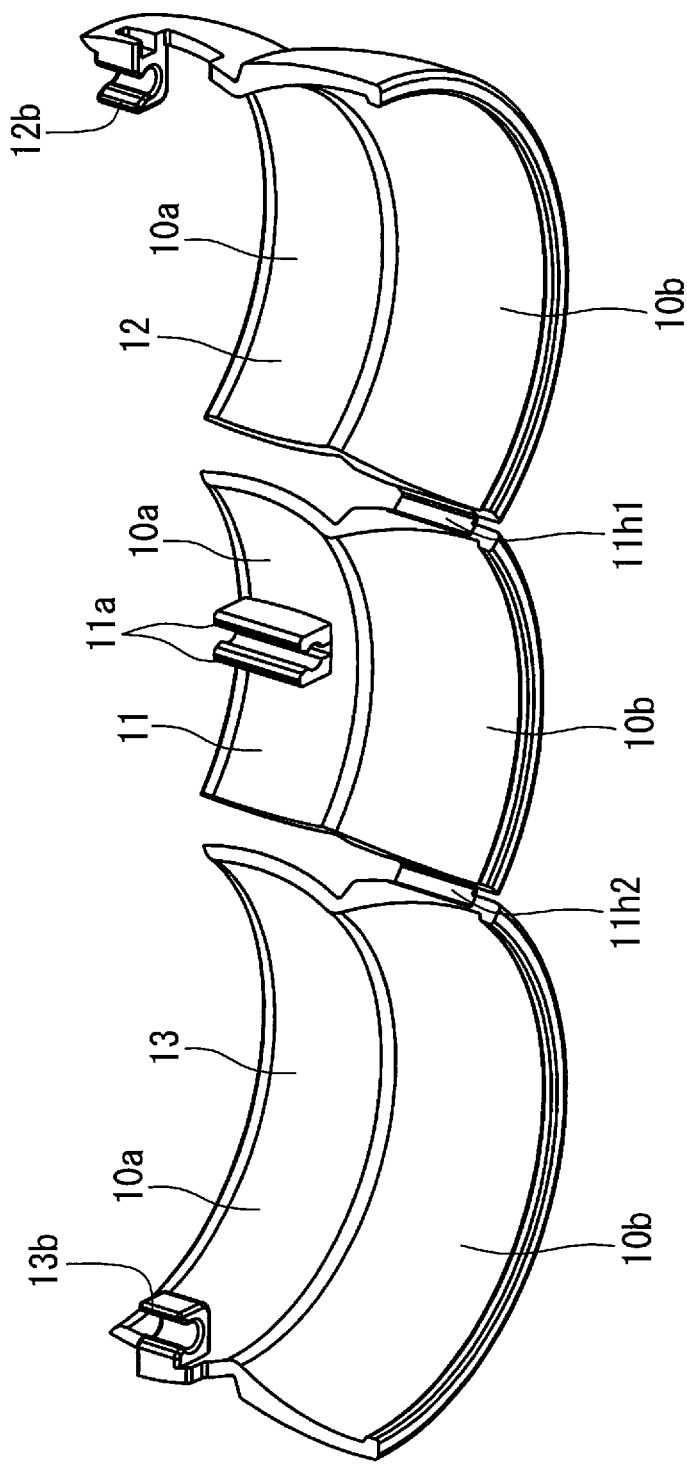
FIG. 11 is a illustrative view of a cable protector according to another embodiment of the present disclosure.

FIG. 11 shows another embodiment of the present disclosure. A difference from the above embodiment is the structure of connecting the second and third segments 12 and 13 to the first segment 11. Features common to those of the above embodiment will be given corresponding reference numerals, with detailed descriptions omitted. In this embodiment, the first and second segments 11 and 12 are connected by a thin hinge 11h1 (so-called living hinge) in place of the upper engagement portion 11b and engagement pin 12a in the embodiment described above. Furthermore, in this embodiment, the first and third segments 11 and 13 are connected by a thin hinge 11h2 (so-called living hinge) in place of the lower engagement portion 11c and engagement pin 13a in the embodiment described above. The hinges 11h1 and 11h2 may be unitarily molded when the first, second and third segments 11, 12 and 13 are injection molded. This reduces the number of parts as well as the number of steps in assembling the second and third segments 12 and 13 with the first segment 11.

In the foregoing, particular embodiments of the present invention has been described. As will be described below, some features of the above embodiments can be modified, and such modifications constitute additional embodiments. Appropriate combinations of such modifications are also additional embodiments.

The support member 20 has been described above in an embodiment as configured such that the arm sections 21 have skeletal portions 21A covered by covering portions 21B, and are connected by the linear sections 22 molded of the same plastic unitary with the covering portions 21B. However, the present invention is not limited to this embodiment, and the support member 20 may be configured such that the arm sections 21 that are independently molded are arranged at intervals along the central axis CL and connected by the linear sections 22 molded of a flexible material. The flexible material is not limited to softer plastics such as nylon 12, but may be a rubber or elastomer.

The outer shell section 10b of the shell 10 has been described above in an embodiment as having the projection 10b3, the end of which slides on the outer surface 10a1 of the inner shell section 10a of the adjacent shell 10. However, the present invention is not limited to this embodiment, and the inner surface 10b2 of the outer shell section 10b of the shell 10, not provided with any such projection 10b3, may be in surface engagement with the outer surface 10a1 of the inner shell section 10a of the adjacent shell 10.

The arm section 21 of the support member 20 has been described above in an embodiment as having two arms 21b extending radially from the base 21a with respect to the central axis CL. However, the number of arms 21b extending radially from the base 21a with respect to the central axis CL may be three or more. It is desirable that the angles at which the arms 21b are arranged around the central axis CL are equal.

While specific embodiments of the present invention have been described, it should be obvious to those skilled in the art that the invention is not limited to those embodiments, and numerous variations, modifications, and alterations are possible without departing from the scope of the present invention. Accordingly, embodiments of the invention include all alternations, modifications, and variations that do not depart from the spirit and purpose of the appended claims.

The invention claimed is:

1. A cable protector comprising:
    a series of generally cylindrical shells, with adjacent shells pivotable relative to each other; and
    a support member extending through the shells, the support member holding the shells so that the shells cannot be separated from each other, the support member comprising arm sections, corresponding to the shells, connected by flexible linear sections formed of a softer plastic, and extending along a central axis of the shells, each arm section comprising a base connected to a corresponding flexible linear section, and a plurality of arms extending radially outward at equal angles, each arm having a first end connected to the base, and a second end connected to a surface of the shell facing toward the central axis, each arm section comprising a skeleton formed of a harder plastic, and a covering portion formed of the same softer plastic as the flexible linear sections, the covering portion covering at least part of the surface of the skeleton, and the covering portion being molded unitary with the linear section.

2. The cable protector of claim 1, each shell comprising an outer shell section having an inner surface defining part of a first sphere, and an inner shell section having an outer surface defining part of a second sphere, the outer and inner shell sections abutting axially of the cylindrical shell, each pair of adjacent shells being arranged such that the inner shell section of a first of the adjacent shells bears against the outer shell section of a second of the adjacent shells, and the center of the second sphere of the inner shell section of the first shell coincides with the center of the first sphere of the outer shell section of the second shell, and the linear section being positioned such that the coinciding sphere center falls on the central axis of the linear section.

3. The cable protector of claim 1, each arm including a lockable portion at the second end, and each shell including corresponding locking portions on a surface facing toward the central axis, the locking portions of the shells engaging the lockable portions so that the shells are connected to the support member.

4. The cable protector of claim 3, each shell comprising at least one opening/closing circumferential segment making a cable accessible to inside from outside, the at least one opening/closing segment having a first circumferential end including one of the locking portions, and a second circumferential end including a hinge pin extending parallel to the central axis, the opening/closing segment being connected at the second circumferential end to another segment of the shell by the hinge pin, allowing the opening/closing segment to be opened and closed.

* * * * *